Figure 1:
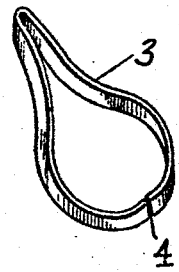

W. JOHNSON.
ART GLASS AND METHOD OF MAKING THE SAME.
APPLICATION FILED NOV. 14, 1907.

952,527.

Patented Mar. 22, 1910.
2 SHEETS—SHEET 1.

Attest:

Inventor:
by Walter Johnson
Atty.

W. JOHNSON.
ART GLASS AND METHOD OF MAKING THE SAME.
APPLICATION FILED NOV. 14, 1907.
952,527.
Patented Mar. 22, 1910.
2 SHEETS—SHEET 2.
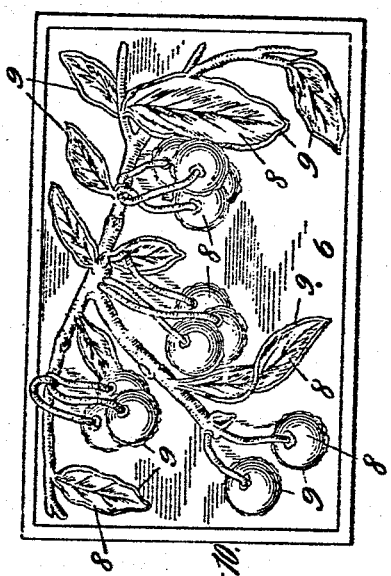
Fig. 10.
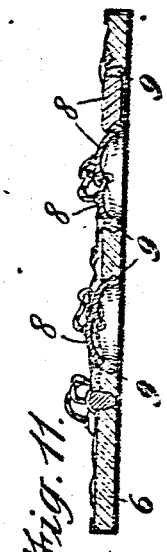
Fig. 11.
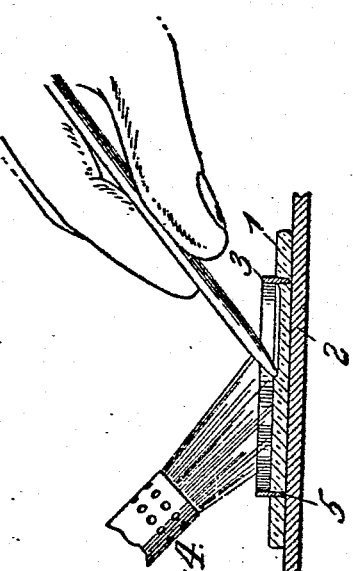
Fig. 5.
Fig. 8.
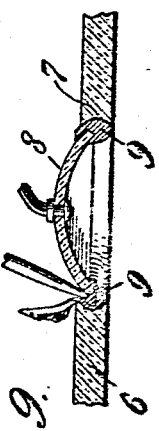
Fig. 9.
Fig. 4.
WITNESSES:
INVENTOR
Walter Johnson
BY
ATTORNEY

UNITED STATES PATENT OFFICE.

WALTER JOHNSON, OF BROOKLYN, NEW YORK.

ART GLASS AND METHOD OF MAKING THE SAME.

952,527.  Specification of Letters Patent.  Patented Mar. 22, 1910.

Application filed November 14, 1907. Serial No. 402,122.

*To all whom it may concern:*

Be it known that I, WALTER JOHNSON, a citizen of the United States of America, and a resident of Brooklyn, in the county of Kings and State of New York, have invented certain new and useful Improvements in Art Glass and Methods of Making the Same, of which the following is a specification.

This invention relates to methods of making glass articles and the product thereof, and more particularly to the manufacture of art glass; and the object is to enable a form of art glass, far superior to the form known as "leaded glass," to be produced with comparative ease and cheapness. More particularly, the object is to produce art glass objects in a much more simple manner than heretofore, these objects being particularly applicable as elements of composite art glass designs.

With reference to the well-known "leaded glass," made by building up pieces or fragments of glass and connecting them by solder, several drawbacks may be noted. In the first place, the leading is clumsy, the method of manufacture necessitating that the edges of the glass fragments be bound with metal, the surface flanges of which are then traced with a soldering iron. More important, the several elements of the completed article are merely cut from flat sheets of glass of appropriate colors, and these, when united by the prominent leading, constitute an absolutely flat design, with little opportunity to suggest perspective, and with no attempt at surface modeling in simulation of the objects represented. In fine, the mode of manufacturing leaded glass has never permitted the production of relief designs. A further, and very practical defect of this form of glass is, of course, its fragility, the only remedies for this defect being to make the leading very heavy and to employ unsightly reinforcing devices.

In the field of manufacture, the difficulties encountered are serious, the time required long, the waste heavy, and the consequent expense large. The several pieces of glass must be cut from larger sheets or panes, and it is a difficult matter to cut accurately a fragment of irregular design. Frequently many pieces must be cut and discarded before one of proper shape for the particular purpose is had. Again, there is the difficulty of securing proper colors. If a piece of glass of a certain shade be required to give the proper color effect at a certain point in the design, it is frequently necessary to cut into many sheets of different shades, before a piece is secured giving the proper color effect by transmitted light. Finally, it is a matter of obvious difficulty to build up a comparatively large article from small bits of glass, and the operation of leading is necessarily slow and laborious.

I make the radical departure of discarding the system of building up from small fragments, and substitute a method in which openings of the proper form and size are made in a one-piece ground of glass, and the elements of the design are inserted in these openings. Further, the glass inserts, constituting the elements of the design, are not cut from flat sheets of glass, but are modeled from hot, plastic glass, in imitation of the objects represented, so that a design in relief is obtained. This form of art glass lends itself particularly to floral and similar effects, it being possible to reproduce the several plant structures with striking fidelity, as to general form, surface modeling, and color. By modeling the inserts from hot, plastic glass, I am not limited to the range of colors in a stock of sheets of glass, but may obtain any desired shade by blending different color glasses while hot and plastic. Further, since the one-piece ground gives the requisite strength to the completed article, the leading between the inserts and the ground may be very fine. Of course, I do not limit myself to the use of but one piece of glass for the entire body of the completed article; and it will be understood that the expression "one-piece" is to be interpreted as referring to a unit of structure.

In carrying out my invention, I take a body or sheet of glass, either flat or curved, and preferably by chemical means form openings of the desired outline therein. The chemical agency may be hydrofluoric acid, or other suitable reagent. The ground is first covered with a resisting substance, as waxy material, with the exception of the regions which it is desired to eat out, and the chemical then applied. By this means, I am enabled to form the apertures with great certainty and exactitude. Preferably, the chemical is allowed to eat half-way through from one side, after which the opening is completed by allowing the chemical to attack the reverse side in the same manner. The result is that the margins of the openings are undercut from both sides, the acid having a tendency to increase its area of operation as it eats inward. This method of formation is of great advantage, as it renders the operation of securing the inserts in position much simpler and more effective.

In securing the inserts in position in the openings, I first pack or plug metal foil, as copper foil, around the edges of the inserts, thus providing what may be termed a filler. The surface of this filler is then treated with a suitable flux, and a soldering iron is then run along the line of the filler. The solder which is deposited in this operation permeates through the porous packed filler, producing what is practically an alloy and resulting in a solid structure. Leading effected in this manner may be very delicate and unobtrusive, so that it may emphasize, without marring, the design.

Figure 2:
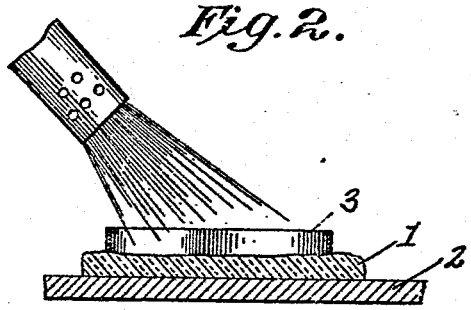
Figure 3:
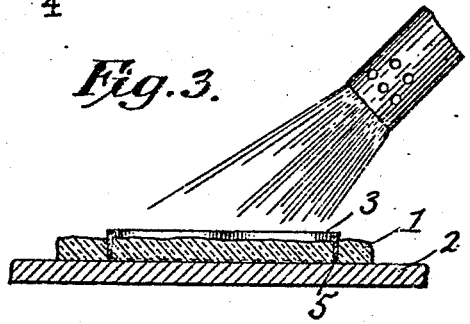
Figure 6:
Figure 7:

In the accompanying drawings, Figure 1 is a perspective view of one of the band-like forms used in making the elements of the composite glass sheet; Fig. 2 is a vertical sectional view, showing the form resting on the body of plastic glass, prior to being forced down therein; Fig. 3 is a similar view, showing the form inserted in the body of glass; Fig. 4 is a similar view illustrating how the upper surface of the plastic element may be modeled with suitable tools; Fig. 5 is a similar view showing the form and contents reversed upon the supporting surface and an elevation being formed in the plastic element by pressure from the rear; Fig. 6 is a perspective view, showing the modeling completed but the article still within the form; Fig. 7 is a perspective view like the last, but showing the form partially removed; Fig. 8 is a plan view of the glass ground provided with openings for the reception of the modeled inserts; Fig. 9 is a vertical sectional view illustrating how the inserts are secured in the openings; Fig. 10 is a plan view of a completed composite sheet displaying a floral design formed by the inserts; and Fig. 11 is a vertical section through the same.

The first step in the manufacture of the glass inserts is to heat a comparatively thin body of glass to plasticity, 1 indicating the body of glass, and 2 any suitable surface upon which it may rest while being heated and manipulated. The glass body so heated may be merely a portion of a sheet of colored glass. This is the case when the completed article is to be of but one color. Or the body may comprise several small pieces of glass of different colors, placed side by side and heated until they are welded together. If a particular shade is desired, it may be produced by heating two pieces of glass of proper color, and blending them together while plastic to form a new color. The heating during these operations, and subsequently during the process, may be effected in any suitable manner; but I prefer, as indicated in Fig. 3 to use a blow-pipe, or similar, flame, directed downward. The striking peculiarity of this method of making the inserts is the utilization of forms for the retention of the glass being worked, and subsequently, while cooling. One of these forms is illustrated in Fig. 1, and is designated by the numeral 3.

While it will be obvious that the forms may be made in a variety of ways, I prefer to construct them of single strips or bands of comparatively thin metal, copper being suitable, which are bent to present the outline of the object which it is desired to produce. For example, the form shown in the drawing has a leaf-outline. The two ends of the strip are brought substantially into contact, with each other, but are not permanently connected, leaving an open joint 4. This split structure is of great value with reference to the removal of the forms from the completed articles inclosed therein; but it is obvious that the forms may be rendered separable in many ways; nor do I limit myself even to a form which may be opened.

The forms are preferably made from narrow strips of metal, the thickness of the glass body largely determining the depth of the form. I find that it is very satisfactory to make the form of a depth approximately twice the thickness of the glass body,—for example, if the glass be an eighth of an inch in thickness, the form may be a quarter of an inch deep. But it will be obvious that the matter of proportions is not material.

The form may be applied by shaping the plastic body of glass roughly to the outline desired, after which the form may be placed around it. However, the most advantageous and expeditious manner is to force the form down into the body of glass, as indicated in Fig. 3. In either case the internal contour of the form defines the peripheral outline of the modeled element and confines the plastic glass during the modeling operation.

I would call attention to the fact that the best results are obtained by heating the body of glass and the form simultaneously, the form being allowed to rest on top of the body while the latter is being heated to plasticity, as indicated in Fig. 2. In this way, the glass and the form are brought to substantially the same temperature. The glass is by no means brought to a state of fusion; and the form should be forced in when the glass still exerts a considerable resistance to its entry.
In order to prevent the glass adhering to the form, the latter should previously be coated with a substance opposite in nature to that of a flux. A graphite paste serves the purpose very well.
It is to be noted that the form is not forced entirely through the glass, which would cut out the inclosed portion entirely; but there is left a thin film 5 between the lower edge of the form and the supporting surface. As a matter of fact, it would be very difficult to overcome the resistance of this film by pressure on the form; but its presence is a distinct advantage, as when the completed article is taken from the form, the portion of the film which is carried with it forms a slight flange which is useful in anchoring the insert in position in the opening in the glass ground.

The portion of the plastic glass body which is isolated within the form is modeled, while the glass is still plastic, with suitable tools, in imitation of the object to be represented. Convexity is secured by pressure from the rear and suitable surface working, the veining of leaves, and the like, is reproduced in the plastic material with proper tools, and, in general, any desired surface modeling may be secured. Since the form projects above the surface of the glass body, the whole may be turned over upon the supporting surface, to permit manipulation of the rear or under surface, without disturbing the modeling of the upper surface, which is now brought next to the supporting plane, but spaced therefrom. Of course, it will be obvious that the portion of the glass body within the form may be punctured, if desired, and a piece of glass or other object inserted in the opening thus made.

After the working and modeling of the contents of the form is completed, the whole is allowed to cool in the open atmosphere; and here occurs a notable phenomenon: while the portion of the glass outside the form cracks and breaks in cooling, as would naturally be expected, the inclosed portion remains intact, and within a few minutes may be thrust into water without injury. This result I ascribe to the influence of the retaining band or form. After the glass is cool, I separate the modeled object within the form from the body of the glass by breaking the thin film 5 and removing the content of the form. This removal is facilitated by the split in the form, since the latter may be peeled, as it were, from the modeled insert, as indicated in Fig. 5.

The glass object so produced will be found to possess surface discoloration, due to the glass having been heated and worked in the air and in contact with flame. I have discovered that the color of the glass may be restored by treating it with a chemical agent, such as hydrofluoric acid, which eats away a very thin layer of the surface, bringing the untouched interior color to view.

While I have described this method of making glass objects more particularly with reference to composite art glass, it will be obvious that it may be employed in the production of glass objects for other purposes. The essence of the invention is the modeling of hot plastic glass while inclosed in a form, so that it may not lose its outline; and the discoveries involved are first, that glass may be worked in this manner in the open air and allowed to cool, also in the open air, without fear of breaking, and second, that the colors apparently lost in the operation may be restored by chemically removing the surface layer of glass. Of course, the skin which is removed in this way is so extremely thin that even the most delicate modeling is not affected.

I wish to call attention to the fact, that, while I have constantly referred to glass, this is to be understood as a generic term, as I frequently find it advantageous to make use of enamels, particularly in adding a patch of color to an insert while being modeled in its form. These enamels are merely a special form of glass, containing varying per cents. of metallic oxids.

Throughout the specification and in the claims it must be understood that I use the verb "model" and its several parts in the special sense which it imports in connection with the fine arts, namely the manipulation of plastic material for the production of preconceived artistic configuration. It will be obvious that casting or molding glass, blowing glass, and the like, have nothing whatever to do with modeling.

In Fig. 8 is shown the glass ground 6, provided with suitable openings 7 for the reception of the glass inserts 8. These openings are formed preferably by eating with acid, first from one side and then from the other, thus producing openings formed completely through the ground and undercut from both sides. The nature of the openings is shown particularly in Fig. 9. This enlargement of the diameter of the openings intermediate the surfaces of the glass ground enables the inserts to be secured in place more firmly than would otherwise be possible. As already indicated, the action of the acid is conveniently controlled by covering such portions of the glass surface as it is not desired to etch with a waxy resist that will not be attacked by the acid.

Fig. 9 shows how the inserts are secured in the openings. First, metal foil, as copper foil, is packed or tamped between the margins of the insert and of the opening. This of itself can afford a substantial anchorage for the inserts; but the best results are obtained by applying solder over the packed foil 9 by means of a soldering iron, the foil being first treated with a suitable flux. The solder or lead penetrates into the comparatively porous filler formed by the packed foil, and forms practically an alloy therewith. This new form of leading is peculiarly effective, both mechanically and artistically.

It will be understood that the tools indicated in Figs. 4, 5 and 9 may be of any suitable kind, and that their particular form will vary according to the nature of the particular operation to be performed.

What I claim as new is:

1. The method of making modeled glass elements of composite art glass sheets, which consists in heating a suitable portion of glass to plasticity, defining the peripheral outline of the element and confining the plastic glass by inclosing the same in a form the internal contour of which corresponds to the desired peripheral outline of the completed element, and then modeling the so-inclosed plastic glass to the desired surface configuration.

2. The method of making modeled glass elements of composite art glass sheets, which consists in heating a suitable portion of glass to plasticity, defining the peripheral outline of the element and confining the plastic glass by inclosing it in a form the internal contour of which corresponds to the desired peripheral outline of the completed element, then modeling the so-inclosed plastic glass to the desired surface configuration, and then allowing the modeled element to cool within its form, whereby fracture is avoided.

3. The method of making modeled glass elements of composite art glass sheets, which consists in heating a suitable portion of glass to plasticity, defining the peripheral outline of the element and confining the plastic glass by inclosing the same in a form open at top and bottom and having an internal contour corresponding to the desired peripheral outline of the completed element, and then modeling the so-inclosed plastic body from both sides to secure the desired surface configuration.

4. The method of making modeled glass elements of composite art glass sheets, which consists in heating a suitable portion of glass to plasticity, defining the peripheral outline of the element and confining the plastic glass by inclosing it on a suitable supporting surface in a form open at top and bottom, deeper than the thickness of the glass, and having an internal contour corresponding to the desired peripheral outline of the completed element, then modeling the so-inclosed plastic glass from one side, and then reversing the form and contents on the supporting surface and modeling from the other side.

5. The method of making modeled glass elements of composite art glass sheets, which consists in heating a suitable portion of glass to plasticity, defining the peripheral outline of the element and confining the plastic glass by inclosing the same in a band-like form of metal the internal contour of which corresponds to the desired peripheral outline of the completed element, and then modeling the so-inclosed plastic glass to the desired surface configuration.

6. The method of making modeled glass elements of composite art glass sheets, which consists in heating a suitable portion of glass to plasticity, defining the peripheral outline of the element and confining the plastic glass by inclosing the same in a split band-like form the internal contour of which corresponds to the desired peripheral outline of the completed element, then modeling the so-inclosed plastic body of glass to the desired surface configuration, next allowing the modeled element to cool within the form, thus avoiding fracture, and finally stripping the form from the modeled element.

7. The method of making modeled glass elements of composite art glass sheets, which consists in heating a suitable portion of glass to plasticity, defining the peripheral outline of the element and confining the plastic glass by inclosing the same in a form the internal contour of which corresponds to the desired peripheral outline of the completed element, said form having been coated internally with a material to prevent fusion with the glass, then modeling the so-inclosed plastic glass to the desired surface configuration, allowing the modeled element to cool within the form, thus avoiding fracture, and finally removing the form from the modeled element.

8. The method of making modeled glass elements of composite art glass sheets, which consists in heating a comparatively thin body of glass to plasticity upon a suitable supporting surface, forcing downward therein and substantially therethrough a form the internal contour of which corresponds to the desired peripheral outline of the completed element, and modeling the so-inclosed plastic glass to the desired surface configuration.

9. The method of making modeled glass elements of composite art glass sheets, which consists in heating simultaneously upon a suitable supporting surface a comparatively thin body of glass and a form placed thereon and having an internal contour corresponding to the desired peripheral outline of the completed element, when the glass has become plastic forcing said form down into the glass, and modeling the so-inclosed plastic glass to the desired surface configuration.

10. The method of making modeled glass elements of composite art glass sheets, which consists in heating a comparatively thin body of glass to plasticity upon a suitable supporting surface, forcing downward therein and almost entirely therethrough a form of an internal contour corresponding to the desired peripheral outline of the completed element, modeling the so-inclosed plastic portion to the desired surface configuration, allowing the whole to cool, breaking away the film of glass connecting the portions within and without the form, and removing the form from the inclosed portion.

11. The method of making modeled glass elements of composite art glass sheets, which consists in inclosing a hot, plastic body of glass within a form the internal contour of which corresponds to the desired peripheral outline of the completed element, modeling the so-inclosed plastic body of glass in the open air to the desired surface configuration, allowing the glass to cool, and treating the surface of the modeled element with a chemical agency to remove surface discoloration.

12. The method of making the herein described new form of composite art glass, which consists in making openings through a glass ground in accordance with a predetermined ornamental design, making and modeling from hot, plastic glass inserts imitating in color, peripheral outline and raised and depressed surface configuration the objects represented by the elements of the design, and securing said inserts in said openings to reproduce the ornamental design in relief.

13. A new form of composite art glass, comprising a glass ground provided with openings whose outlines correspond to a preconceived ornamental design, plastic-modeled glass inserts imitating in color, peripheral outline and raised and depressed surface configuration the objects represented by the elements of said design and together reproducing the ornamental design in relief, and means securing said inserts in said openings.

Signed at New York, N. Y. this 11th day of November 1907.

WALTER JOHNSON.

Witnesses:
J. F. BRANDENBURG,
FREDERICK C. BONNY.